US009007173B2

(12) United States Patent
McIntyre et al.

(10) Patent No.: US 9,007,173 B2
(45) Date of Patent: Apr. 14, 2015

(54) SYSTEM AND METHOD FOR ACCESSING A STRUCTURE USING DIRECTIONAL ANTENNAS AND A WIRELESS TOKEN

(71) Applicant: Yikes LLC, Monticello, IN (US)

(72) Inventors: Jim E. McIntyre, Mooresville, IN (US); Andrew Joseph Robertson, Monticello, IN (US); William Benjamin Robertson, Monticello, IN (US)

(73) Assignee: Yikes LLC, Monticello, IN (US)

( * ) Notice: Subject to any disclaimer, the term of this patent is extended or adjusted under 35 U.S.C. 154(b) by 0 days.

(21) Appl. No.: 14/253,122

(22) Filed: Apr. 15, 2014

(65) Prior Publication Data

US 2014/0225713 A1    Aug. 14, 2014

Related U.S. Application Data

(63) Continuation-in-part of application No. 14/105,279, filed on Dec. 13, 2013, which is a continuation of application No. PCT/US2012/042683, filed on Jun. 15, 2012.

(60) Provisional application No. 61/498,169, filed on Jun. 17, 2011.

(51) Int. Cl.
| | |
|---|---|
| *G07C 9/00* | (2006.01) |
| *H04W 4/04* | (2009.01) |
| *H04W 12/08* | (2009.01) |
| *H04W 48/04* | (2009.01) |
| *H04L 29/06* | (2006.01) |
| *H04W 4/00* | (2009.01) |

(52) U.S. Cl.
CPC .. *G07C 9/00309* (2013.01); *G07C 2009/00317* (2013.01); *H04L 63/0853* (2013.01); *H04L 63/107* (2013.01); *H04W 4/008* (2013.01); *H04W 4/043* (2013.01); *H04W 12/08* (2013.01); *H04W 48/04* (2013.01)

(58) Field of Classification Search
CPC ................. G07C 2009/00793; G07C 9/00111; G07C 9/00571; G07C 9/00904; H04L 63/0876; H04L 63/107; H04L 63/0853; H04W 12/06; H04W 88/06; H04W 48/04; H04W 12/08; H04W 4/043; H04W 4/008; E05B 53/00
USPC ...................... 340/5.6, 5.61, 5.64, 5.7, 686.2; 713/186; 726/6, 26; 343/893
See application file for complete search history.

(56) References Cited

U.S. PATENT DOCUMENTS

| | | | | |
|---|---|---|---|---|
| 7,119,744 | B2 * | 10/2006 | Theobold et al. | 343/700 MS |
| 7,446,644 | B2 * | 11/2008 | Schaffzin et al. | 340/5.6 |

(Continued)

OTHER PUBLICATIONS

International Search Report and Written Opinion issued in PCT/US2012/042683, dated Dec. 26, 2012.

*Primary Examiner* — Steven Lim
*Assistant Examiner* — Sisay Yacob
(74) *Attorney, Agent, or Firm* — Woodard, Emhardt, Moriarty, McNett & Henry LLP

(57) ABSTRACT

A wireless device access system that employs directional antennas for short-range wireless communication to detect the proximity and orientation of a user device with respect to a structure is disclosed. The access system receives and authenticates an unlock request and confirms the proximity and orientation of the user device prior to transmitting an unlock command to the structure. This authentication may occur through the use of substantially opposing directional antennas separated by a ground plane. Additionally, the wireless device may require the proximity of a user token prior to operation and/or the access system may include an override within the structure blocking any unlock command.

25 Claims, 6 Drawing Sheets

(56) References Cited

U.S. PATENT DOCUMENTS

| | | | |
|---|---|---|---|
| 2002/0099945 A1* | 7/2002 | McLintock et al. | 713/186 |
| 2004/0174247 A1* | 9/2004 | Rodenbeck et al. | 340/5.64 |
| 2006/0287016 A1* | 12/2006 | Portaro et al. | 455/575.7 |
| 2009/0066476 A1* | 3/2009 | Raheman | 340/5.64 |
| 2009/0289873 A1* | 11/2009 | Schilling et al. | 343/893 |
| 2010/0201482 A1 | 8/2010 | Robertson et al. | |
| 2010/0283579 A1* | 11/2010 | Kraus et al. | 340/5.7 |
| 2011/0065391 A1 | 3/2011 | Shiotsuki | |

* cited by examiner

SYSTEM AND METHOD FOR ACCESSING A STRUCTURE USING DIRECTIONAL ANTENNAS AND A WIRELESS TOKEN

CROSS REFERENCE TO RELATED APPLICATIONS

This application is a continuation-in-part of U.S. patent application Ser. No. 14/105,279, filed Dec. 13, 2013, which is a continuation of International Patent Application No. PCT/US2012/042683, filed Jun. 15, 2012 which claims the benefit of U.S. Provisional Application No. 61/498,169 filed Jun. 17, 2011, each of which is hereby incorporated by reference to the extent not inconsistent.

FIELD OF THE INVENTION

The present invention generally relates to an access system including a wireless token and a proximity and location verification device. More particularly, the present invention pertains to a three point access system which includes a wireless token which transmits a request for access which ultimately results in a door being unlocked.

SUMMARY

Disclosed is a wireless device access system which employs short-range wireless communication and one or more directional antennas to require the presence of a user device within a designated area proximate to an entry point of a structure prior to providing access to the structure. The access system includes a wireless node having a wireless transmission area proximate to or covering the entry point which authenticates a user device for a certain structure when the user device comes within range of the wireless node. In response to authenticating the user device, the wireless node sends a wake-up signal to an access device associated with the certain structure, such as a lock on an entry point. In response to the wake-up command, the access device will remain active for a predetermined but limited period of time so as to be available to communicate with a user device. Additionally, in some forms, the wake-up command may also issue a notification triggering an in-room system to prepare the room, such as by turning on the lights or other user specified actions. In a further form, the wake-up command may include a temporary security code for verifying an unlock command sent by a user device. When the user device comes within range of the recently activated access device, provided that the access device is still active, the user device will communicate its credential information to the access device for confirmation. In addition, the access device utilizes at least a pair of directional antennas to confirm that the requesting user device is within a designated area, such as a 2 foot semi-circular area outside of a door. Such a location confirmation ensures that access to a structure won't ever be improperly granted based upon a user device within the structure or within an adjacent structure. Upon confirming the authorization associated with the provided access code and confirming that the user device is within the designated area, the access device grants the user access to the structure by unlocking the entry. In a further form, the two directional antennas are separated by a ground plane to improve their relative performance.

DETAILED DESCRIPTION

Figure 1:
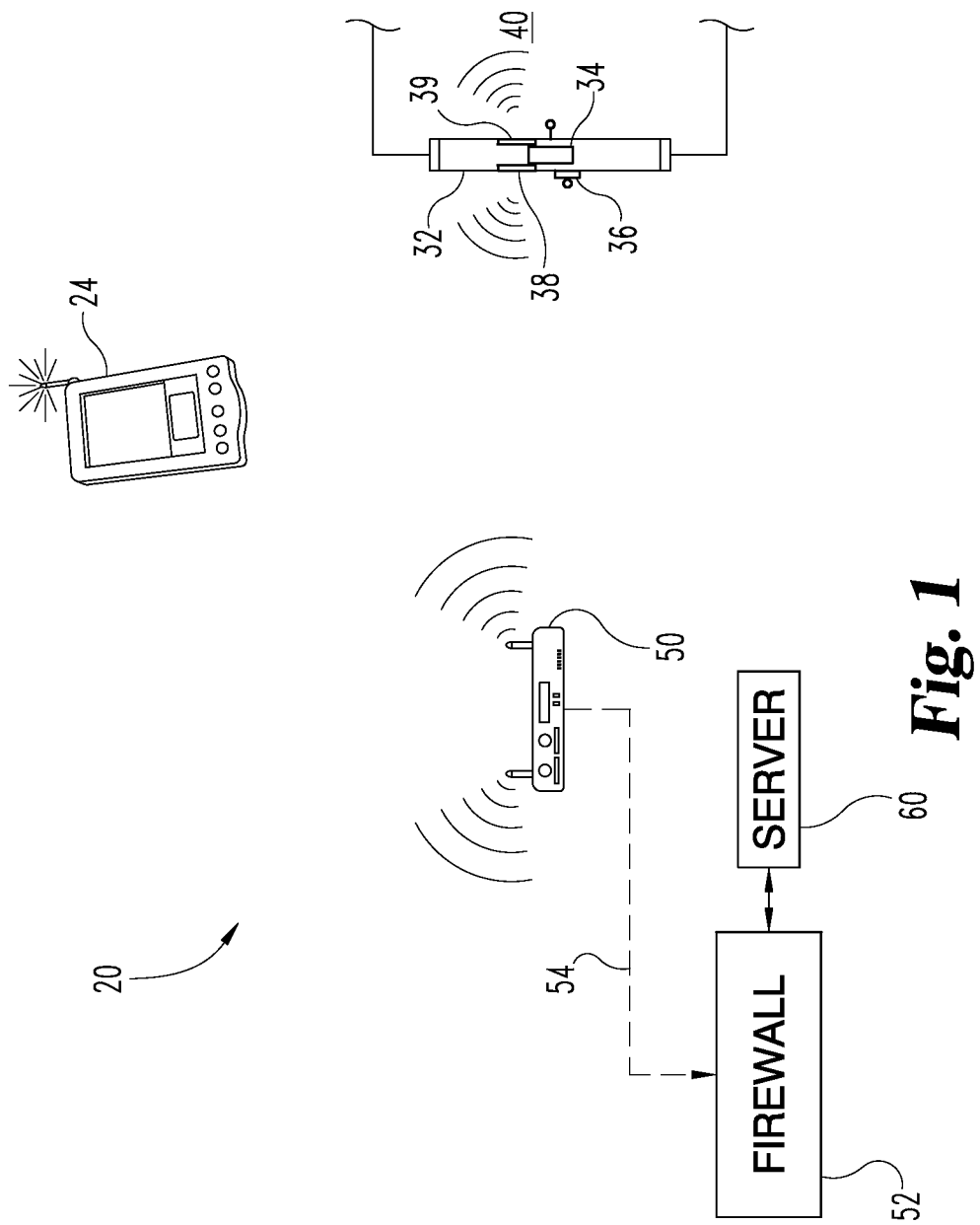
FIG. 1 is a diagrammatic view of an access system according to one implementation of the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Currently, systems exist, such as the Signature RFID/NFC system from VingCard, which provide a user access to a hotel room using their mobile phone. Alternatively, other point-to-point systems exist which provide access to an office, lab, or other secured area using a wireless token, such as an RFID tag or card. However, such systems are limited in that the token is limited to a single identifier which leaves open a crucial security flaw which would allow for duplication of the token's responsive signal. Additionally, given the wireless range of these tokens, an undesirable situation may arise in which the token is within range of the lock or RFID reader when inside of the secured area. This presents the possibility that access may be granted to anyone seeking entry at that time.

As shown in FIG. 1, one embodiment of an access system 20 advantageously permits a user to access a structure 40 using a wireless token 24. In addition to lodging and workplace access systems, it will be appreciated that similar embodiments of the access system to be described also encompass systems for controlling access to other structures or openings/doors thereof. In particular, the access system 20 is particularly well suited to providing access to structures in which the authorized users frequently change, such as a hotel. As such, in the illustrated embodiment, according to FIG. 1, the described system comprises an access system 20 for allowing a hotel guest to access their assigned hotel room 40 using a wireless token 24, which in the preferred form, is an electronic device capable of short range wireless communication, such as a device implementing Bluetooth®, Zigbee®, or some other low-power wireless communication protocol/standard. It shall be understood that many of the descriptions herein are made with respect to a hotel environment and are meant for illustrative purposes and that the concepts herein are generally applicable to a general safety and security access system and are not limited to only a hotel room access system.

Examples of other structures for which the novel access system may be adapted include other rooms within a hotel (i.e. workout rooms, pools, VIP lounges), office buildings, school/university buildings, laboratories, warehouses, and portions thereof, event ticket gates/turnstiles, movie theatres, safety deposit boxes, mailboxes, lockers, or other enclosures for which providing selective user access is desired.

As shown in FIG. 1, according to the illustrative embodiment, the access system 20 includes one or more wireless tokens 24 which allow a user to access their assigned hotel room without a traditional key or card. Illustratively, in some embodiments, the access system 20 includes a data network 54. Data network 54 is preferably a private local area network (LAN) and may comprise the Internet, which is a TCP/IP based global network; however, the user of the term "Internet" herein shall be understood to refer to at least a portion of any public interconnected electronic network which interchanges data by packet-switching.

Access system 20 additionally comprises a mechanical lock 34 for locking and unlocking a structure 40 (partially shown). In the illustrated embodiment, a user gains access to the structure 40 via door 32. In the illustrative embodiment, mechanical lock 34 is a mechanical door lock, which includes a locking mechanism similar to a common entry or exterior lock, but is further capable of self-unlocking in response to an electronic signal, in addition to other functionality described herein. For purposes of non-limiting example, mechanical lock 34 may include a cam lock, rotary latch, electro-mechanical lock, magnetic lock, or the like. According to the preferred form, lock 34 unlocks in response to an electrical signal sent from a wireless token 24 and/or access node 50. In one form, the electrical signal is sent wirelessly, such as over a low-power RF connection, such as a Zigbee® connection. In a further preferred form, the lock 34 returns to a locked state following the passage of a predetermined time period or a user opening and closing the door following the receipt of an unlock signal. In some additional forms, lock 34 or door 40 may also include a mechanical key slot, key card, or other entry permitting authentication means 36 in addition to, or as backup for, that described herein with respect to lock 34. In addition, it shall be appreciated that system 20 may be applied to access restrictions other than locks including, for example, an elevator control system providing limited access, a garage door, or others access barriers, as described later.

Access system 20 also utilizes at least one access node 50 to interface with wireless token 24 and lock 34. Access node 50, as illustrated, is a wireless node implementing a common short-range wireless standard, such as Bluetooth® or ZigBee®, to those implemented by wireless token 24 and lock 34. Access node 50 is also connected to server 60 via firewall 52 and network 54.

In the illustrative form, access system 20 includes a plurality of access nodes, such as access node 50, where each node is strategically positioned near a specified structure (i.e. a hotel room). The access nodes are preferably always in a active mode so that wireless tokens 24 may be connected with them on demand in the event the wireless token 24 is authorized, such as by having an authorized MAC address or some other selected security mechanism. In a further form, the access nodes 50 are not in a discoverable mode and the pairing of the access nodes 50 with wireless token 24 occurs prior to the user's arrival programmatically. Illustratively, in some embodiments, access node 50 is operatively connected to server 60 to process and authenticate electronic unlock requests from wireless tokens 24. Firewall 52 includes at least a hardware or software implemented firewall or other selected security features to prevent external access to server 60 or access node 50.

Figure 3:
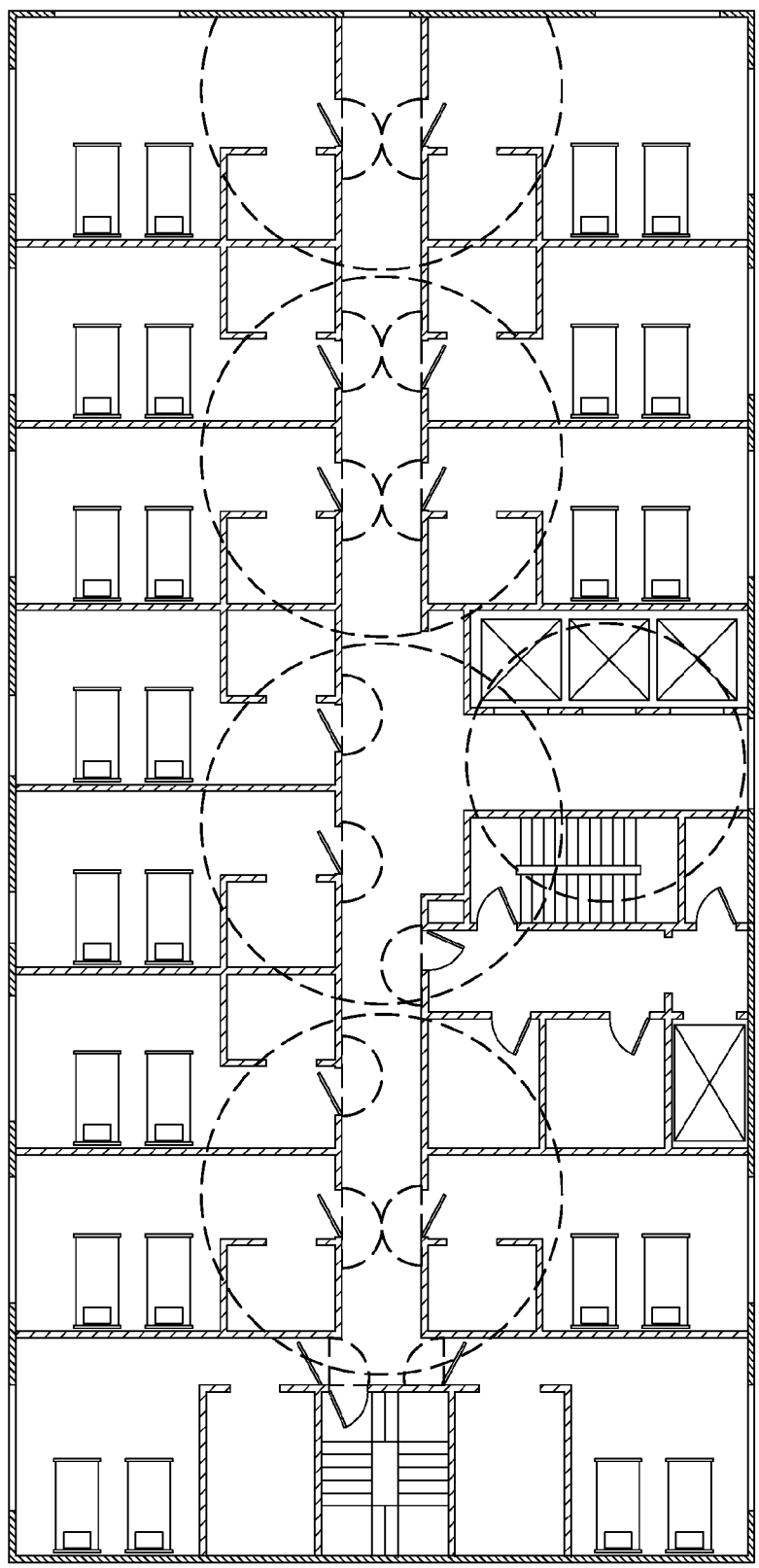
FIG. 3 is a mock floor plan illustrating the coverage areas of the access node and the two door lock antennas in a typical multi-room hotel setting.

The location information maintained by access node 50 is linked to the present/assigned location of the node and is used in processing any unlock request. For example, an access node on the fourth floor of a hotel in downtown Chicago may be assigned a unique hotel identifier coupled with a hotel zone identifier. Alternatively, the node may be assigned a single identifier which is then linked to its location by the wireless token 24 or server 60. For purposes of illustrating the hierarchical relationship between access nodes 50 and the structures which fall within their range, a mock floor plan is shown in FIG. 3. The mock floor plan illustrates a number of complete circles which denote the wireless range of a number of access nodes 50 for purposes of covering the entryway/hallway of a hotel floor and one or more doors.

According to the illustrated embodiment, server 60 operates in conjunction with access node 50 over internal network 54 to authenticate any wireless token 24 which comes within its range. In one form, when a wireless token 24 comes within range of an access node 50, the access node 50 receives information from the wireless token 24 and seeks to identify one or more structures within its coverage area to which the wireless token 24 is authorized to enter. The server 60 serves to authenticate the request or a portion thereof using a reservations and occupancy database, while in other forms, the access node 50 may perform at least a portion of the authentication. In the illustrative embodiment, server 60 processes each request corresponding to an authentication request received by access node 50 from wireless token 24, and upon proper authentication, confirms the authentication for one or more structures to access node 50 which then transmits an electronic signal to the corresponding lock(s), such as lock 34, notifying the lock to wake-up for a predetermined period of time in order to communication with nearby authorized wireless token 24. In a further form, the access node 50 not only notifies lock 34 that it should wake-up, but also communicates information to lock 34 regarding which wireless token 24 it should be expecting.

While server 60 is described and illustrated as being a server, it should be understood that server 60 may be any computer, including a client server arrangement. Server 60 may interface with access node 50 by either a wireless or hardwired interconnection. Preferably, the connection is a secured connection. A non-limiting example list of potential interfaces includes IR, optical, RF, serial port, IP network, and USB. Additionally, the functions of server 60 and access node 50 may be integrated into one computer system.

Once access node 50 as authenticated wireless token 24 and woken-up a selected lock 34, the process proceeds to a second level authentication between the wireless token 24 and lock 34. In the illustrated embodiment, wireless token 24 connects to lock 34 and provides authorization information. In one form, the authorization information provided may be the same as the authorization information provided by wireless token 24 to access node 50, described above. Alternatively, in another form, the authorization information provided by wireless node 24 may be unlock information provided to wireless node 24 by access node 50 earlier in the process. Furthermore, in this form as well as other, upon receiving the authorization information from wireless token 24, lock 34 may communicate with access node 50 to confirm the authorization or wireless token 24. In the event the authorization information received by lock 34 is authorized, by whatever means selected, lock 34 determines that a legitimate unlock request is present.

Figure 4A:
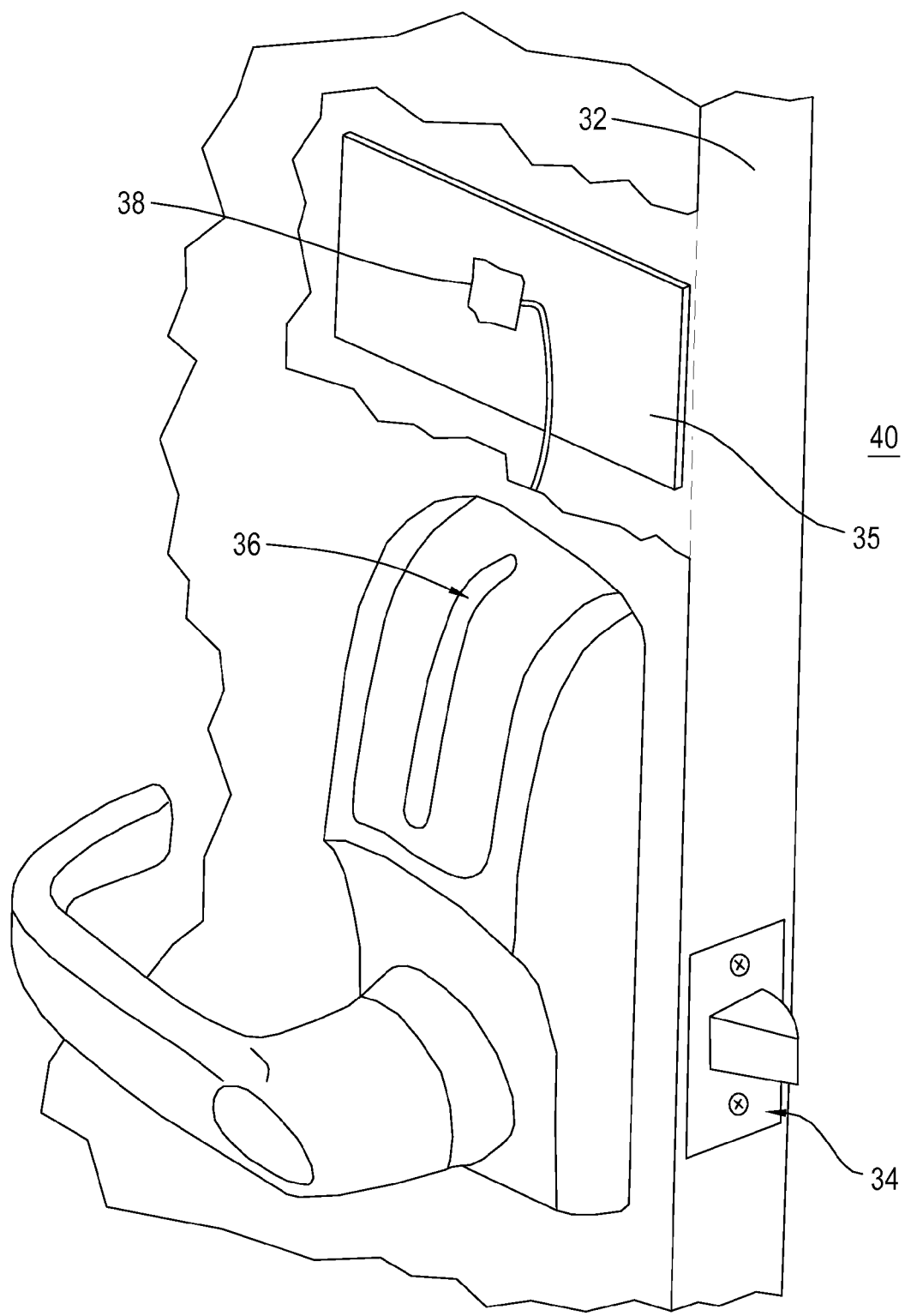
FIGS. 4A and 4B are plan views illustrating opposite sides of one form of a lock as arranged in a door according to one implementation of the present invention.
Figure 4B:
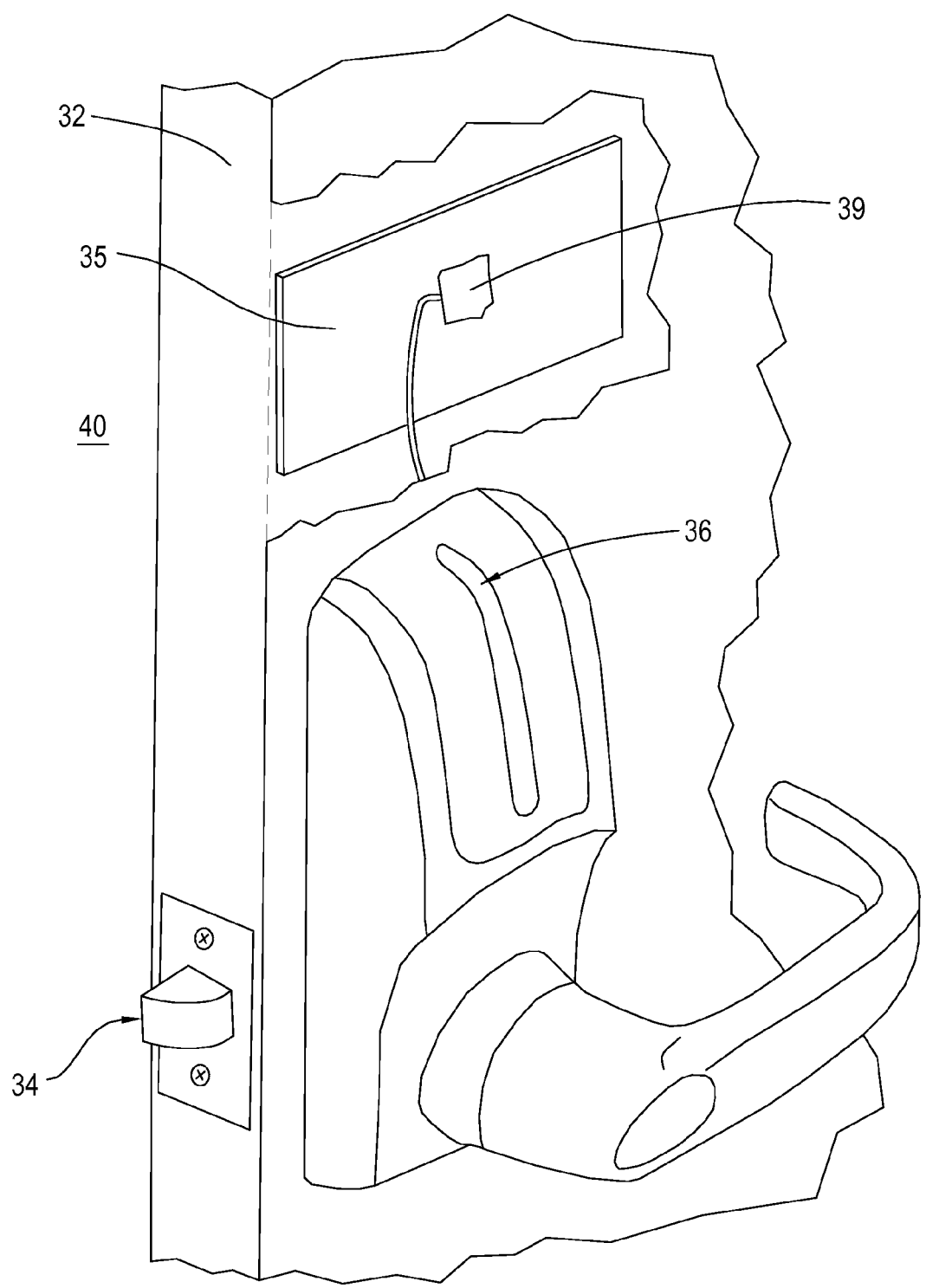

Additionally, either prior to or simultaneous with, lock 34 assesses the location of wireless token 24 to determine whether it is within a designated area. For making this determination, lock 34 includes two directional antennas 38 and 39 which are operable to communicate with wireless token 24 over a low power wireless transmission protocol. As illustrated in FIG. 1 and FIGS. 4A-B, according to the illustrated form, lock 34 and antennas 38 and 39 are located within the mortise of door 32 or in a position proximate thereto. According to the described form, as shown in FIG. 4A, antenna 38 faces outward from door 32 and structure 40 while, as shown in FIG. 4B antenna 39 faces inward from door 32 and into structure 40. These antennas enable lock 34 to determine an approximate location of wireless token 24 with respect to door 32 (i.e. inside or outside of structure 40) based upon a received signal strength indication (RSSI) determined by each of directional antennas 38 and 39.

The direction antennas 38 and 39 are preferably patch antennas, which provide for a low-profile combined with low back-lobe radiation. The low profile makes installations within the cavity of a door or other desired location easier while the low back-lobe radiation enhances the difference in signal strength perceived by the two opposing antennas with respect to the same user device. It shall be appreciated that various sizes of directional antennas 38 and 39 may be used, such as 3.5"×3" or 5.5"×4.5", and that the directional antennas 38 and 39 shown are sized for ease of illustration.

In order to further enhance the difference in signal strengths perceived by direction antennas 38 and 39 with respect to the same user device, the system 20 includes a ground plane 35 which is arranged between direction antennas 38 and 39. Ground plane 35 may be a part of directional antennas 38 and/or 39 or separate therefrom. Ground plane 35 is preferably sized to be larger than direction antennas 38 and 39, and more preferably is sized to be at least twice the size of directional antennas 38 and 39. Ground plane 35 is also preferably made from a radio-frequency reflective material, such as metal or the like. In a further form, ground plane 35 may be replaced by two or more ground planes of the same or varying sizes and/or materials where desired.

In an alternate form, a number of omni-directional antennas implementing beamforming or spatial filtering signal processing may be used as directional antennas 38 and/or 39 as such processing provides for directional signal transmission and reception. As is known in the art, beamforming utilizes an array of omni-directional antennas which results in signals at particular angles experiencing constructive and destructive interference. By shifting the transmitters out of phase with one another, the cross-over points can be manipulated, resulting in a directional nature to the array on omni-directional antennas. In this form, the directional antennas 38 and/or 39 may be located in access node 50 as opposed to in lock 34, and function with more than one door 32, such as to provide inside/outside detection for its associated structure 40.

Using the information obtained from the directional antennas 38 and 39 concerning user device 24, lock 34 can confirm that the requesting user device 24 is within a designated area, such as an 2 foot semi-circular area on the outside of a door. The primary information derived from the directional antennas 38 and 39 is the signal strength received as well as the differential of the signal strength perceived between the two. Such a confirmation ensures that access to a structure won't ever be improperly granted based upon a user device within the structure. For example, the mock floor plan shown in FIG. 3 illustrates a number of desired areas as small half circles outside of hotel room doors, which are the effective coverage areas for the required signal strength to be detected by antenna 38 with respect to wireless token 24. It is only when a wireless token 24 is within these areas that their respective doors may be opened if authorized. Furthermore, a number of larger half circles in the interior of the hotel rooms show the field of coverage of antennas 39 which are used to detect when wireless token 24 is within the corresponding hotel room.

Only after the authentication information received from wireless token 24 is verified and the location of wireless token 24 has been determined to be in the designated area will lock 34 unlock to permit the user access to the structure.

In still other embodiments, lock 34 is operably coupled to an override switch (not shown) having an access disable state. Asserting the override switch prevents the access system 20 from permitting access to corresponding structure 40. As one non-limiting example, the override switch may be asserted when a guest engages a deadbolt or bar latch within their hotel room. In some embodiments of the access system 20, the override switch is incorporated into an electronic control, not shown here, accessible to the user within structure 40.

Figure 2A:
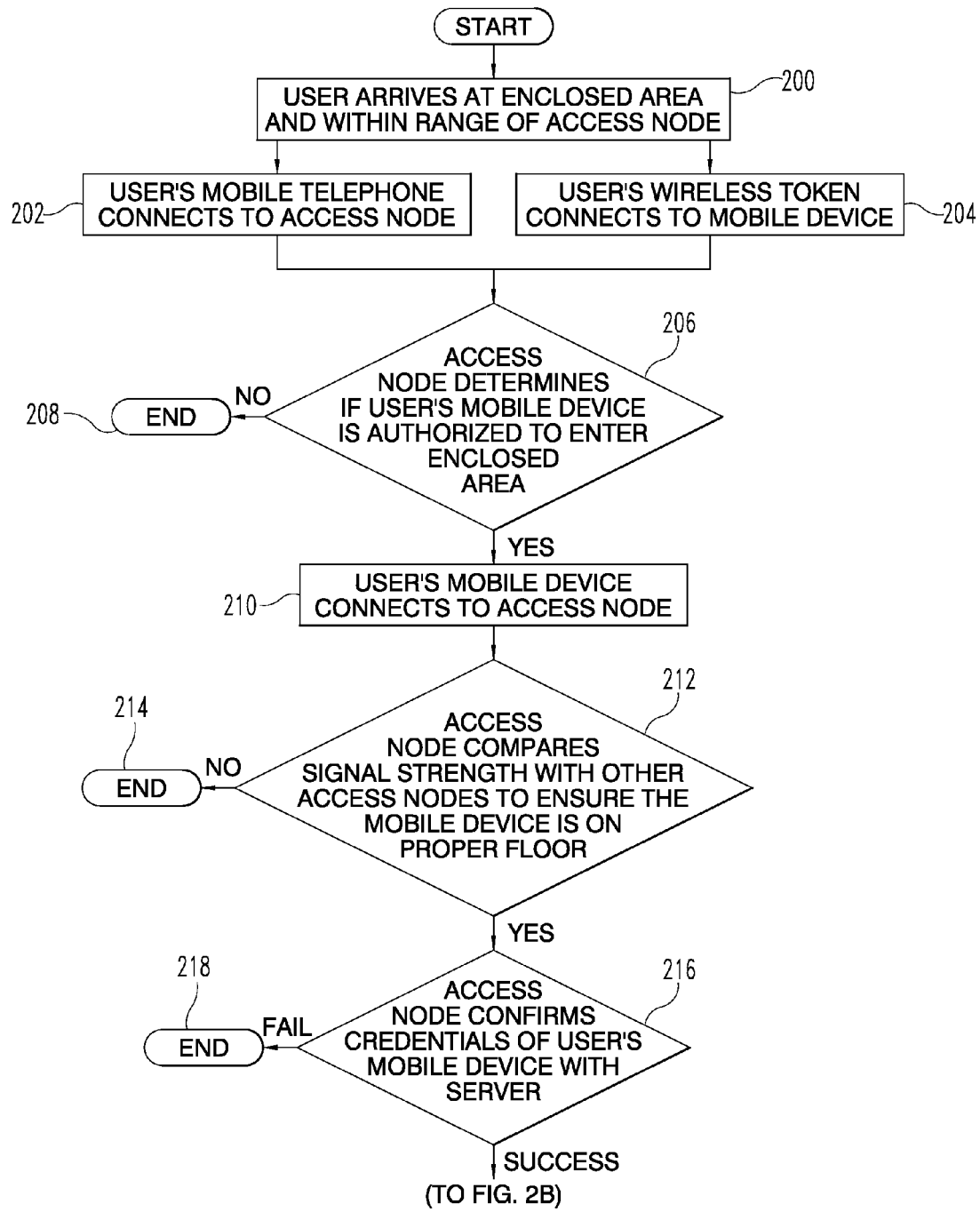
FIG. 2A-2B is a process flow diagram illustrating one set of steps performed in enabling a user to access a structure using the novel access system, including a wireless token.
Figure 2B:
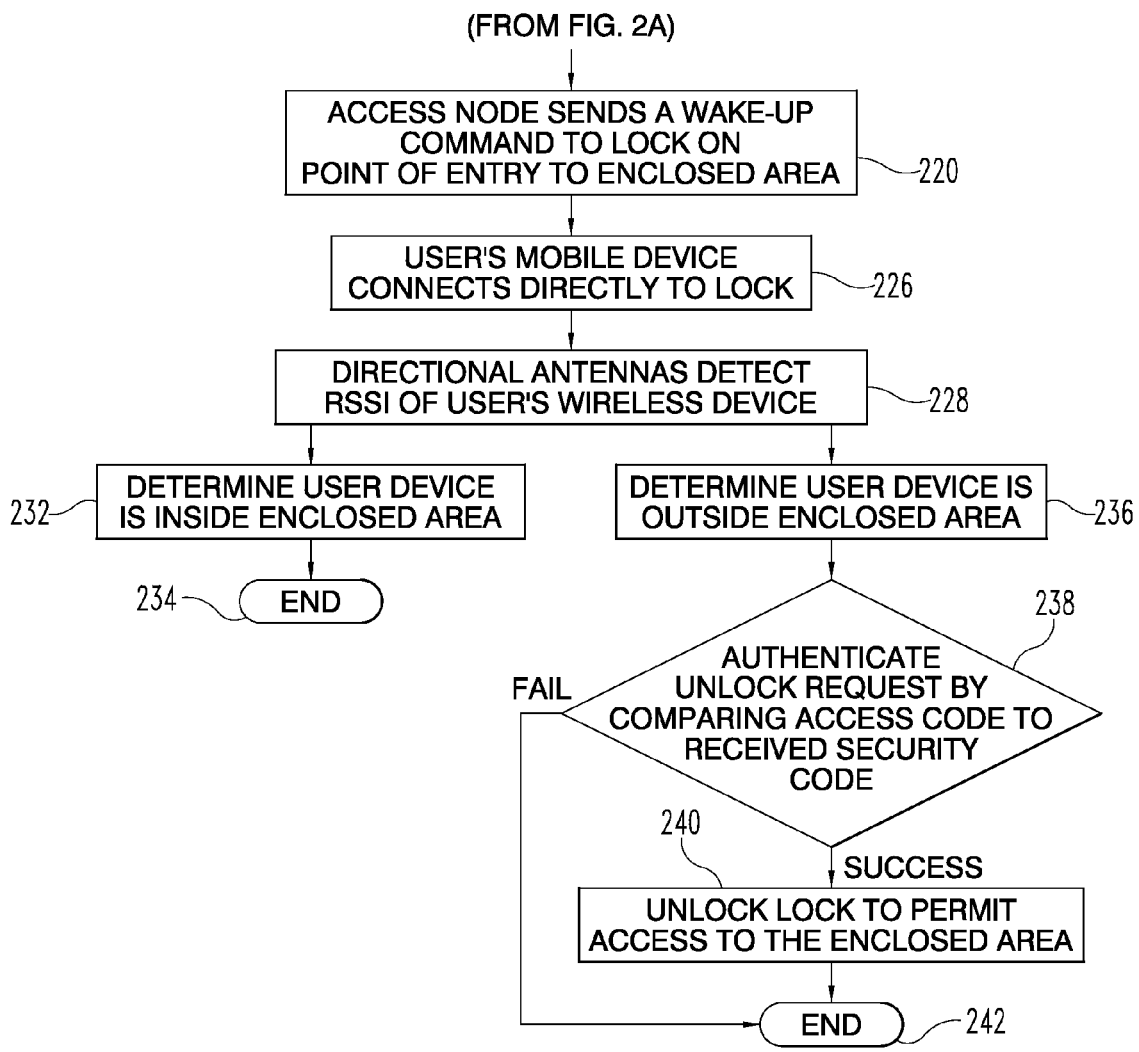

A flowchart illustrating one set of steps performed in configuring a wireless token 24 for use in accessing a structure 40 according to one embodiment of the present invention is shown in FIG. 2. The process involves a wireless token 24 and the various other components of access system 20. The following description is with continuing reference to access system 20 of FIG. 1. As shown in FIG. 1, the wireless token 24 may be a dedicated wireless token or another device, such as a mobile telephone, laptop, tablet, or other portable electronic device; however, it is understood that numerous other networked appliances are also intended.

It shall be appreciated that initial reservation, check-in, and configuration information must be populated within server 60 to enable to access methods described herein to be performed. For example, confirmation information stored by server 60 preferably identifies the hotel and the user and includes a check-in/check-out date along with details of the type of room requested/reserved. In the preferred form, this confirmation information is received by server 60 as a result of a hotel booking being made for a user either online, in person, or over the phone.

Upon checking into the hotel, or being authorized to access some other structure in other adaptations of the system 20, the wireless token 24 is automatically configured to pair with or otherwise connect to access nodes located near the structure 40. Additionally, the details of the assigned room or structure, including its number and location, are then stored by server 60 is association with wireless token 24. This ensures that access nodes 50 will proper identify the room wireless token 24 is assigned to access and be able to authenticate its request for access. It shall be appreciated that this process may be modified to accommodate more than one authorized hotel guest per room, such as having two wireless devices authorized to enter the same hotel room, or allowing a current guest to authorize the wireless device of another to access the hotel room for any portion of their remaining stay.

In continuing the description of the embodiment described with respect to FIG. 2, a flowchart illustrating one set of steps performed in allowing a user to access structure 40 using wireless token 24 and the various other components of access system 20 is shown. The following description is with continuing reference to access system 20 of FIG. 1

As shown in FIG. 2, the process begins at start point 200 with the user along with the wireless token 24 arriving in a location within range of an access node 50. In step 202 or 204, a user device, such as either a mobile telephone or wireless token 24, are detected by the access node 50 respectively. Upon detecting the user device, the access node determines whether or not the user is authorized to enter one of the structure entrances that is proximate to access node 50 (step 206). If the user is not authorized, the process ends at point 208. If the user is authorized, the user device connects to the access node 50 (step 210). Next, in order to ensure that the user is on the proper floor, the access node 50 compares its perceived signal strength from the nearest access nodes of the floor above and below (if available) to ensure that its signal is the strongest (step 212). If the user is determined to be on another floor, the process proceeds to and ends at step 214. Alternatively, if the access node 50 determines that the user is on its associated floor, the process proceeds to step 216. In step 216 the access node 50 collaborates with server 60 to confirm the credentials provided by the user device. In the event the credentials are not confirmed, the process ends at step 218. If the credentials of the user device are confirmed, the process proceeds to step 220 where access node 50 sends a wake-up signal to the lock, such as lock 34, associated with the structure, such as structure 40, to which the user is authorized. Additionally, the access node 50 may detect the type of wireless standard the user device is capable of such that the proper wireless standard may be activated by the selected door lock 34 in step 220. The wake-up signal may also include an access code, such as a temporary alphanumeric code or the like, which must be matched by the user device in order to cause the lock to open.

The second stage of the process beings in step 226 where the user device connects to the now active lock 34. The dual antennas 38 and 39 of lock 34 detect a RSSI from the user device (step 228). In the preferred form, the central focus of the antennas 38 and 39 are directly opposite of one another and are separated by at least one ground plane. However, in an alternate form, the central focus of the antennas 38 and 39 may only be offset by at least 130 degrees. In yet another form, the central focus may differ by 150 degrees or more. In a still further form, the antennas are offset by approximately 180 degrees. If the user device is determined to be inside of the structure, such as by having a stronger signal strength via the internally facing antenna 39, the process proceeds through steps 232, and 234, whereby it is determined that the user is already in the room and the process ends subject to starting over. Alternatively, if is determined to be outside of the structure, such as by having a stronger signal strength via the externally facing antenna 38 or a suitable ration, and at least a certain signal strength to indicate the desired proximity to lock 34 (step 236), the process proceeds to authenticate the request by comparing the security code provided by the user device to the stored access code received from node 50 (step 238) until lock 34 unlocks either provides the user with access to structure 40 (step 240) upon a successful authentication or the process ends at point 242.

In a further form, door lock 34 takes appropriate samples of RSSI relative to wireless token 24 on either side of door, using antennas 38 and 39. For example, the samples may include several periodic RSSI readings which are then averaged or otherwise combine to reduce interference, noise, or the like from a single reading. Based upon these readings, lock 34 makes a determination of whether wireless token 24 is inside and outside of door 32. Additionally, the lock 34 may use the RSSI samples of antenna 38 to determine the distance wireless token 24 is from lock 34 for purposes of determining its presence within the defined proximity range outside of the door 32 as well. In a further form, the determination of whether a user device is inside or outside of a room requires that the RSSI detected by one directional antenna (such as 38) must be a predetermined amount of percentage greater than that of the opposing directional antenna (such as 39). Once measurements averages are conducted, and presence of token/device and it is determined that he is in the proper unlock zone (range of outside proximity), the unlock of step 242 is granted.

In yet another form, lock 34 may periodically transmit information to access node 50 for passing along to server 60 which indicates the user is still in the hotel room. This information may trigger the in-room temperature to be maintained, and upon detecting that the user is no longer in the room, the temperature may be raised to a user-specified or standard level or it may trigger the lights to be turned off, as described in U.S. patent application Ser. No. 10/126,486 to Sunyich entitled "Personalized Smart Room", which is hereby incorporated by reference to the extent not inconsistent.

While the invention has been illustrated and described in detail in the drawings and foregoing description with respect to a hotel access system, the same is to be considered as illustrative and not restrictive in character, it being understood that only the preferred embodiment has been shown and described and that all equivalents, changes, and modifications that come within the spirit of the inventions as described herein and/or by the following claims are desired to be protected. By way of non-limiting example, the system described herein may be applied to other enclosed areas where selective access is desired, including, other structures such as offices, amusement parks, military bases, restricted areas, vehicles, homes, etc.

What is claimed is:

1. An access system allowing a user to access an enclosed area using a wireless user device, the access system comprising:
   a database storing access permissions identifying at least one wireless user device authorized to access said enclosed area;
   a mechanical locking device securing a point of entry to said enclosed area, said locking device operably connected to at least one short-range wireless receiver suitable for receiving an unlock request from said wireless user device and subsequently responding by granting access through said point of entry when said unlock request is authorized using said database,
   wherein said at least one short-range wireless receiver includes a first and second directional antenna which are mounted to said point of entry, are separated by at least one ground plane, and are oriented such that the centers of their fields of reception are offset by an angle of at least 130 degrees, and
   wherein said authorizing requires a comparison of the received signal strength indicator of said first directional antenna to that of said second directional antenna.

2. The access system according to claim 1, wherein said at least one short-range wireless radio is a Bluetooth radio.

3. The access system according to claim 1, wherein the centers of the fields of reception of said first and said second directional antennas are offset by an angle of at least 150 degrees.

4. The access system according to claim 1, wherein said at least one short-range wireless radio is an 802.11 radio.

5. The access system according to claim 1, wherein said enclosed area is a structure and said point of entry is a door.

6. The access system according to claim 5, wherein said mechanical locking device is located in the mortise of said door.

7. The access system according to claim 5, wherein at least one of said first and said second directional antennas is located in the mortise of said door.

8. The access system according to claim 5, wherein said structure is a hotel room.

9. The access system according to claim 1, wherein said wireless user device is a mobile telephone.

10. The access system according to claim 1, wherein said directional antennas are patch antennas.

11. An method for granting access to a secured area based on a wireless user device, the method comprising the steps of:
maintaining an electronic database storing access permissions identifying at least one wireless user device authorized to access one or more secured areas;
receiving a first access request for an identified secured area at an access node from a wireless user device, wherein a point of entry of said secured area is within the transmission range of said access node and said access node is in electronic communication with said database;
authenticating at least a portion of said access request with said access node using said database;
confirming the presence of said wireless user device within a predefined area adjacent to said point of entry using at least two directional antennas in electronic communication with said access node; wherein the centers of the fields of reception of said two directional antennas are offset by an angle of at least 130 degrees and said predefined area is less than the transmission range of said access node;
generating an electronic indication to allow access to said secured area through point of entry when said access request is authorized and said wireless user device is within said defined area.

12. The method for granting access according to claim 11, further comprising the steps of:
determining a received signal strength indicator for said wireless user device for each of a first and second directional antenna positioned adjacent to said point of entry, wherein the centers of the fields of reception of said first and said second directional antennas are offset by an angle of at least 130 degrees; and
wherein said confirming requires that the ratio of said first and said second received signal strength indicators indicates that said wireless user device is within said predetermined area.

13. The method for granting access according to claim 12, wherein the centers of the fields of reception of said first and said second directional antennas are offset by an angle of at least 150 degrees.

14. The method for granting access according to claim 11, wherein said enclosed area is a structure and said point of entry is a door.

15. The method for granting access according to claim 14, wherein at least one of said first and said second directional antennas is located in the mortise of said door.

16. The method for granting access according to claim 12, wherein said confirming utilizes at least four directional antennas.

17. An method for granting access to an enclosed area based on a wireless user device, the method comprising the steps of:
establishing a short-range radio frequency pairing with a wireless user device using a wireless enabled access node within a door securing said enclosed area; wherein said access node includes a mechanical lock device;
determining if said wireless user device is authorized to access said enclosed area based upon a security code received from said wireless user device;
determining a received signal strength indicator for said wireless user device using each of a first and second directional antenna, wherein the centers of the fields of reception of said first and said second directional antennas are offset by an angle of at least 130 degrees; and
unlocking said mechanical lock device to provide access to said enclosed area in the event said wireless user device is authorized and the ratio of said first and said second received signal strength indicators indicates that said wireless user device is outside of said enclosed area.

18. The method of claim 17, wherein said short-range radio frequency pairing utilizes UHF radio waves in the ISM band from 2.4 to 2.485 GHz.

19. The method of claim 17, wherein said short-range radio frequency pairing utilizes radio waves in the 915 MHz band.

20. The method of claim 17, wherein first and said second directional antennas are positioned on or within said door.

21. The method of claim 17, wherein the centers of the fields of reception of said first and said second directional antennas are offset by an angle of at least 150 degrees.

22. The method of claim 17, wherein said enclosed area is a structure and said point of entry is a door.

23. The method of claim 22, wherein said mechanical locking device is located in the mortise of said door.

24. The method of claim 23, wherein at least one of said first and said second directional antennas is located in the mortise of said door.

25. The method of claim 17, wherein said first and said second directional antennas are beamforming arrays.

* * * * *